US009047778B1

(12) United States Patent
Cazanas et al.

(10) Patent No.: US 9,047,778 B1
(45) Date of Patent: Jun. 2, 2015

(54) COLLISION AVOIDANCE SYSTEM USING TELEMATICS UNIT

(75) Inventors: Carlos A. Cazanas, Bethlehem, PA (US); Azam Khan, Franklin, NJ (US); Matthew Butz, Haslet, TX (US)

(73) Assignee: Cellco Partnership, Basking Ridge, NJ (US)

( * ) Notice: Subject to any disclaimer, the term of this patent is extended or adjusted under 35 U.S.C. 154(b) by 559 days.

(21) Appl. No.: 12/823,737

(22) Filed: Jun. 25, 2010

(51) Int. Cl.
*G08G 1/16* (2006.01)
(52) U.S. Cl.
CPC ....................................... *G08G 1/16* (2013.01)
(58) Field of Classification Search
USPC .......................................................... 701/301
See application file for complete search history.

(56) References Cited

U.S. PATENT DOCUMENTS

| 5,933,099 | A | * | 8/1999 | Mahon | 340/961 |
| 5,983,161 | A | * | 11/1999 | Lemelson et al. | 701/301 |
| 6,791,472 | B1 | * | 9/2004 | Hoffberg | 340/905 |
| 2005/0107954 | A1 | * | 5/2005 | Nahla | 701/301 |
| 2005/0187701 | A1 | * | 8/2005 | Baney | 701/117 |
| 2006/0164218 | A1 | * | 7/2006 | Kuttenberger et al. | 340/435 |
| 2007/0152804 | A1 | * | 7/2007 | Breed et al. | 340/435 |

OTHER PUBLICATIONS

"New Highway Safety Device to be Patented." PR Newswire: 1018CL023. Oct. 18, 1995.*
"Buick LeSabre to be used for Crash Avoidance Research." PR Newswire: 9390. Nov. 8, 1999.*
"Ford's New Smart Intersection 'Talks' to Cars to Help Reduce Collisions, Fuel-Wasting Congestion." PR Newswire: NA. Jul. 10, 2008.*
Entire USPTO Prosecution History of Dunne, U.S. Appl. No. 11/785,448, filed Apr. 18, 2007, entitled Hierarchical Telematics Emergency Call Direction.
Entire USPTO Prosecution History of Dunne et al, U.S. Appl. No. 11/819,188, filed Jun. 26, 2007, entitled Network Activation PF a Telematics Unit for Wireless Communication.
Entire USPTO Prosecution History of Cazanas et al, U.S. Appl. No. 12/512,627, filed Jul. 30, 2009, entitled Broadcast Media Information Capture and Communication Via a Wireless Network.
Entire USPTO Prosecution History of Bennett et al, U.S. Appl. No. 12/491,861, filed Jun. 25, 2009, entitled Systems and Methods for Mobile Station Validation.
Entire USPTO Prosecution History of Cazanas et al., U.S. Appl. No. 12/823,771, filed Jun. 25, 2010, entitled Law Enforcement Vehicle Information Authorization System.

* cited by examiner

*Primary Examiner* — Sheetal R Rangrej

(57) ABSTRACT

The various examples disclosed herein relate to systems, methods, and equipment that provide location and velocity monitoring of both a user's vehicle and another vehicle to avoid collision. The examples are applicable for using on-board telematics units to process that information and provide additional information based thereon such as the probability of collision. In some examples, if the chances of collision are high based on information received, warnings may be given to the vehicle's user. Based on these warnings, the user may take evasive maneuvers to reduce the probability of collision and prevent it. In other examples, if the chances of collision are high, the vehicle may decelerate without prompting from the user to minimize the impact of the collision. Any emergency reporting by the telematics unit, e.g. if a collision still occurred, may be enhanced with the relative location and velocity data from some interval prior to the emergency.

8 Claims, 5 Drawing Sheets

COLLISION AVOIDANCE SYSTEM USING TELEMATICS UNIT

TECHNICAL FIELD

The present subject matter relates to techniques and equipment used with a vehicle's telematics unit to wirelessly receive information from other vehicles, such as location and velocity information broadcast from a telematics unit in another motor vehicle, to enable the unit in the user's vehicle to provide the user with information based on relative location and velocity of the two vehicles, such as a warning if there is a likelihood that the vehicles may collide.

BACKGROUND

In recent years, increasingly sophisticated telematics systems have been developed to detect vehicle locations as well as the speed and direction at which the vehicle is traveling. Systems have been developed for monitoring fixed customer locations as well as for vehicle applications. Upon detecting a crash condition, the on-board system activates a cellular transceiver to initiate a cellular telephone call to a call center of the telematics service provider (TSP). Upon connection to the call center, the system may communicate certain data, such as location determined by global positioning satellite (GPS) processing, identification data and crash related data. After the data transmission, the call is converted to a voice call in which a TSP representative at the call center can attempt voice communication with an occupant of the vehicle. The TSP also offers mechanisms for the representative to contact emergency service personnel in the area, to respond appropriately to the incident. More recently, such systems have been enhanced to offer other related services, such as navigation services like turn-by-turn directions. GPS based on-board navigation systems have also become common, which provide the vehicle operator with location and velocity information. However, these telematics and navigation systems generally do not provide information that may help avoid collisions.

Additionally, on-board systems have been developed that may monitor one or more sensors to alert the driver of the nearness of certain unseen obstacles, for example, while parking or backing up. Such an on-board system monitors the location and velocity of its vehicle and alerts the driver of unseen obstacles, such as other vehicles, for example, when the other vehicles come within a few feet of the sensors. As another example, adaptive cruise control systems provide an adaptive vehicle speed control, based on sensing of another vehicle or target in front of the host vehicle. Although these sensing technologies provide some proximity information based on direct sensing of another vehicle or object, the on-board system receives no information about the locations or velocities of other vehicles in the area. The sensors may not alert the user of the nearness of other vehicles until it is too late to avoid these obstacles when traveling at significant speeds. This often results in vehicles unexpectedly coming into close proximity at speeds which may make it impossible to maneuver to avoid each other, thereby allowing collisions to occur.

SUMMARY

Examples of telematics units are described and shown which provide the user/driver of a vehicle with information that may help to avoid a collision, based on sensing of the location and speed of the vehicle and receiving a wireless transmission of location and speed information regarding another vehicle from a telematics unit in the other vehicle.

For example, a method is disclosed herein for a user's vehicle to receive location and velocity information from one or more other vehicles and to use such information to determine the probability of a collision to assist in avoidance of such a collision. The telematics unit on user's vehicle receives the location and velocity information from another vehicle broadcasting the information wirelessly in the area. Additionally, any vehicle route information from the other vehicle's on-board navigation system may be obtained if such information exists and is available. In the situation where information for multiple vehicles is received, the user may use the user interface to determine which vehicle's location and velocity information to use. Alternatively, the decision may be made based on programming in the telematics unit.

The telematics unit of the user's vehicle also receives information about location and velocity of the vehicle through various sensors located on the vehicle. Once the information about both vehicles is obtained, the telematics control unit calculates the relative location and velocity of the two vehicles and outputs the information to the user via the user interface. The telematics control unit also makes calculations using the relative location and velocity data such as the probability of collision, the amount of time until a collision occurs, or any other data that may be relevant to avoid a collision. If a collision is imminent, a hazard alert may be sent to the user interface to indicate that a collision is likely. Additionally, the user's vehicle may decelerate in response to certain collision criteria in order to attempt to avoid the collision.

If a collision does occur, the crash data as well as any relative location and velocity information and calculations may be sent to the call center of a telematics service provider. Such information may be sent to emergency personnel in order to give them more information about the crash and its severity.

The detailed description discloses examples of devices that may be used to carry out the process described above. One disclosed example shows a telematics unit with a receiver to receive location and velocity information from other vehicles, sensors for obtaining location and velocity information of the user's vehicle as well as any crash data, and a telematics control unit for determining the relative location and velocity of the two vehicles and for carrying out any calculations based thereon. In an example provided, a hazard alert is included when the calculated information indicates a collision may occur.

In some examples, a network access device is included in the telematics unit to transmit any relative location and velocity information to the call center of a telematics service provider. This is used if a collision cannot be avoided and an accident occurs. Additionally, in situations where it is beneficial to transmit the user's vehicle location and velocity information to other vehicles in the area, a transmitter is provided. The transmitter takes information obtained from the sensors via the telematics control unit and broadcasts that information using a short range broadcast medium.

In other examples, a component capable of receiving location and velocity information for other vehicles may be added to an existing telematics unit that lacks that functionality. The component includes a receiver to receive the information from the telematics unit as well as similar units in other vehicles. This component is connected to the existing telematics unit so that the component is able to receive location and velocity information from the vehicle sensors. Once this information is received, the control unit determines relative location and velocity and carries out any desired calculations based thereon. This information will be sent back to the existing telematics unit to be output to the user via the user interface. A hazard alert is also included. It may be sent to the user via the interface in the event a collision appears to be imminent. A transmitter may also be included in the component to broadcast the user vehicle's location and velocity information to other vehicles in the area.

The examples of telematics units and method of operation thereof described below and shown in the drawings may provide one or more of the following advantages. One advantage is that the user of a vehicle is able to obtain information about another vehicle directly from the vehicle without traveling through the network. A vehicle user is able to get information beyond the data provided for his own vehicle. Additionally, this information is obtained while the vehicles are still a significant distance apart unlike when another vehicle is sensed directly by the vehicle's proximity sensors. This information may allow the user of the vehicle to maneuver to avoid a collision before getting close enough to be detected by direct sensing. Additionally, the units and methods provided may alert the user of the possibility of a collision so that the user is not caught unaware. It alerts the vehicle user to possible obstacles that the user may otherwise overlook. Another advantage is that user's vehicle may also transmit information regarding its own location and velocity to inform other vehicles in the area so they may also take preventative measures to avoid a collision. Another advantage is that the collision avoidance processing is incorporated in or coupled to a telematics unit, that is to say a system already present in many vehicles; and as a result it is not necessary to develop and deploy a separate additional system for collision avoidance. Instead, collision avoidance can leverage and/or enhance services offered via the telematics unit.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to systems, methods and equipment that provide location and velocity monitoring of both a user's vehicle and another vehicle in the user vehicle's vicinity. This information may be used to avoid a collision. The examples are applicable for using on-board telematics units to process that information and provide additional information based on the processed information such as the probability of collision. In some examples, if the chances of collision are high based on information received, warnings may be given to the vehicle's user. Based on these warnings, the user may take evasive maneuvers to reduce the probability of collision and prevent it. In other examples, if the chances of collision are high, the vehicle may decelerate without prompting from the user to minimize the impact of the collision. Any emergency reporting by the telematics unit, e.g. if a collision still occurred, may be enhanced with the relative location and velocity data from some interval prior to the emergency.

Figure 1:
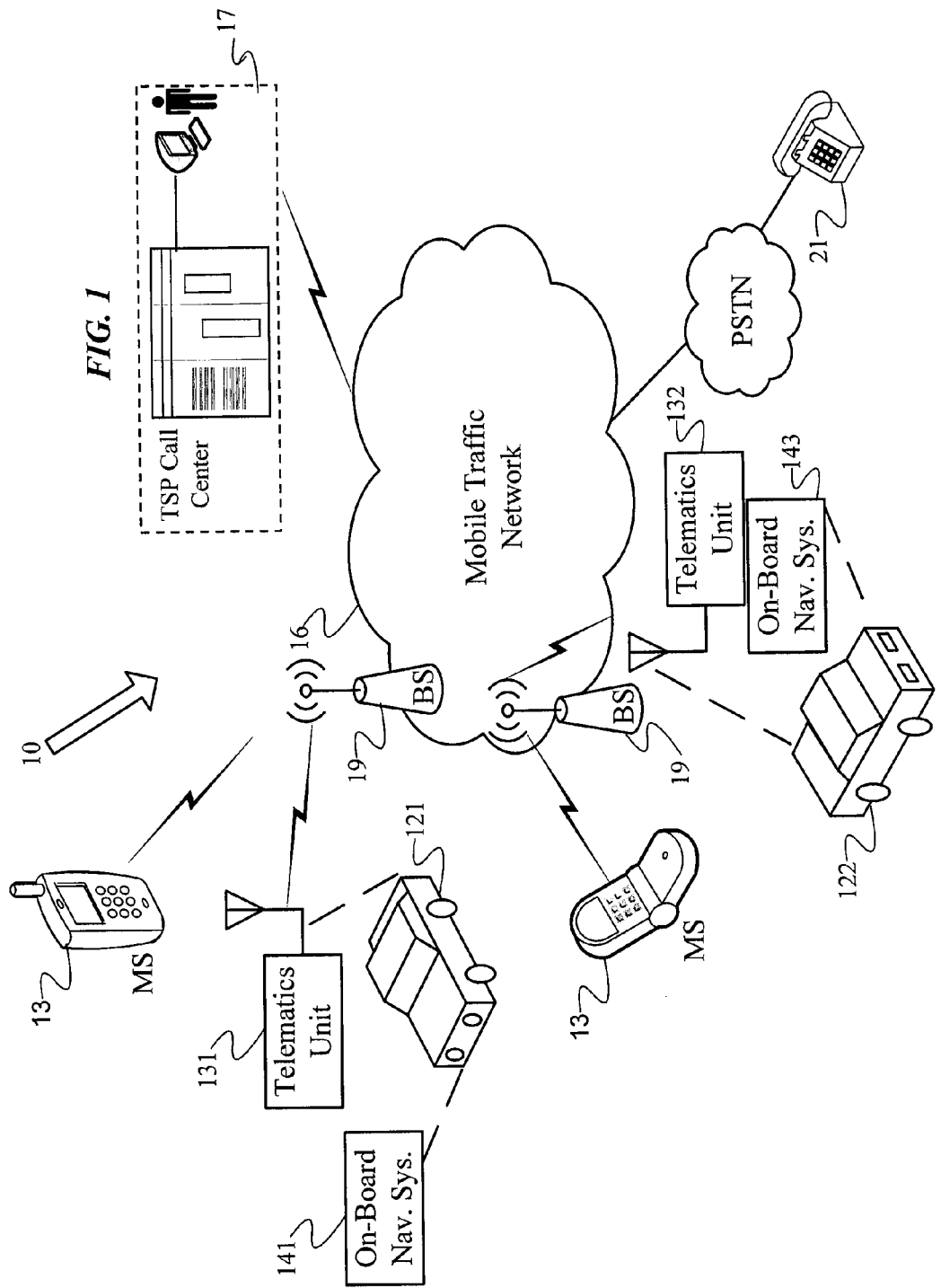
FIG. 1 is a functional block diagram of a system of networks and other equipment, for providing wireless communication services for mobile stations and for telematics communications, in which at least some telematics units are enhanced to offer collision avoidance assistance.

Reference now is made in detail to the examples illustrated in the accompanying drawings and discussed below. FIG. 1 is a functional block diagram of an exemplary system of networks for providing mobile voice telephone services and various data services, including telematics services. In this system, the network 10 is a wireless mobile communication network. The network 10 often (but not always) comprises networks operated by a number of different mobile communication service providers, carriers or operators, although for simplicity of discussion network 10 is assumed to be a network operated by one carrier. The communication network 10 provides mobile voice telephone communications as well as other services such as text messaging and various multimedia packet data services, for numerous mobile devices. One type of mobile device shown in the drawing is users' mobile station 13. The network 10 supports a variety of application services. However, for purposes of discussion, the drawings show an example in which one of the application services relates to a telematics service.

Hence, the drawing discloses a first vehicle 121 having an associated telematics unit 131 and an on-board navigation system 141. The telematics unit 131 alone or in combination with the on-board navigation system 141 is configured for location and velocity detection, crash detection, and related collision avoidance and emergency communication functions. The drawing also shows a second vehicle 122 having an associated telematics unit 132 and an on-board navigation system 143, similarly configured for location and velocity detection, crash detection, and related collision avoidance and emergency communication functions.

From the network perspective, the telematics units 131, 132 are another type of mobile device that communicates via the wireless mobile communication network 10. However, for collisions avoidance, these units may communicate directly with each other without engaging the wireless mobile communications network 10, using a short range broadcast medium if they are within a certain distance of each other. The location and velocity related information as well as other information is sent directly from one telematics unit to another without passing through the network.

Hence, the network 10 may implement wireless communications with the mobile stations 13 (and similar mobile telematics units 131, 132) via any of a variety of different standard communication technologies common in public wireless mobile communication networks. Examples of such technologies include various CDMA standards, including 3GPP2 variants thereof (e.g. 1XRTT or EVDO), as well as TDMA and GSM standards including 3GPP variants (e.g. LTE or UMTS). The mobile stations 13 and the communications elements of the telematics units 131, 132 may be configured to communicate in accord with the wireless standard supported by the network 10, and, in addition, using short range broadcast media. Although many such mobile devices have the capability of communicating via a number of networks that may utilize different standardized technologies (multi-mode devices). Additionally, the telematics units 131, 132 may also be configured to communicate directly in a manner without requiring network access by using, for example, WiFi or any other suitable short range broadcast medium for direct communications outside the network.

The mobile communication network 10 typically is implemented by a number of interconnected networks. Hence, the overall network 10 may include a number of radio access networks (RANs) each including any number of base stations (BSs) 19, as well as regional ground networks interconnecting a number of RANs and a wide area network (WAN) interconnecting the regional ground networks to core network elements. A regional portion of the network 10, such as that serving mobile stations 13 and the telematics units 131, 132, will typically include one or more RANs and a regional circuit and/or packet switched network and associated signaling network facilities.

The radio access networks also include or connect to a traffic network represented generally by the cloud shown at 16, which carries the user communications for the mobile stations 13 and the telematics units 131, 132 between the telematics service provider call center 17 and other elements with or through which the various wireless mobile devices communicate. Individual elements such as switches and/or routers forming the traffic network 15 are omitted here for simplicity. The emergency communications extend through a wireless network offering mobile communication service to data and voice communication equipment at the TSP call center 17. In a typical operation, the telematics unit 131 (or the telematics unit 132) will detect a vehicle condition indicating a crash or other emergency condition of the vehicle 121 or will detect actuation of an "emergency" or "panic" button associated with the telematics unit 131 by a user of the vehicle. In response, telematics unit 131 initiates communication through the mobile communication elements of the network 10 with TSP call center 17.

Figure 2:
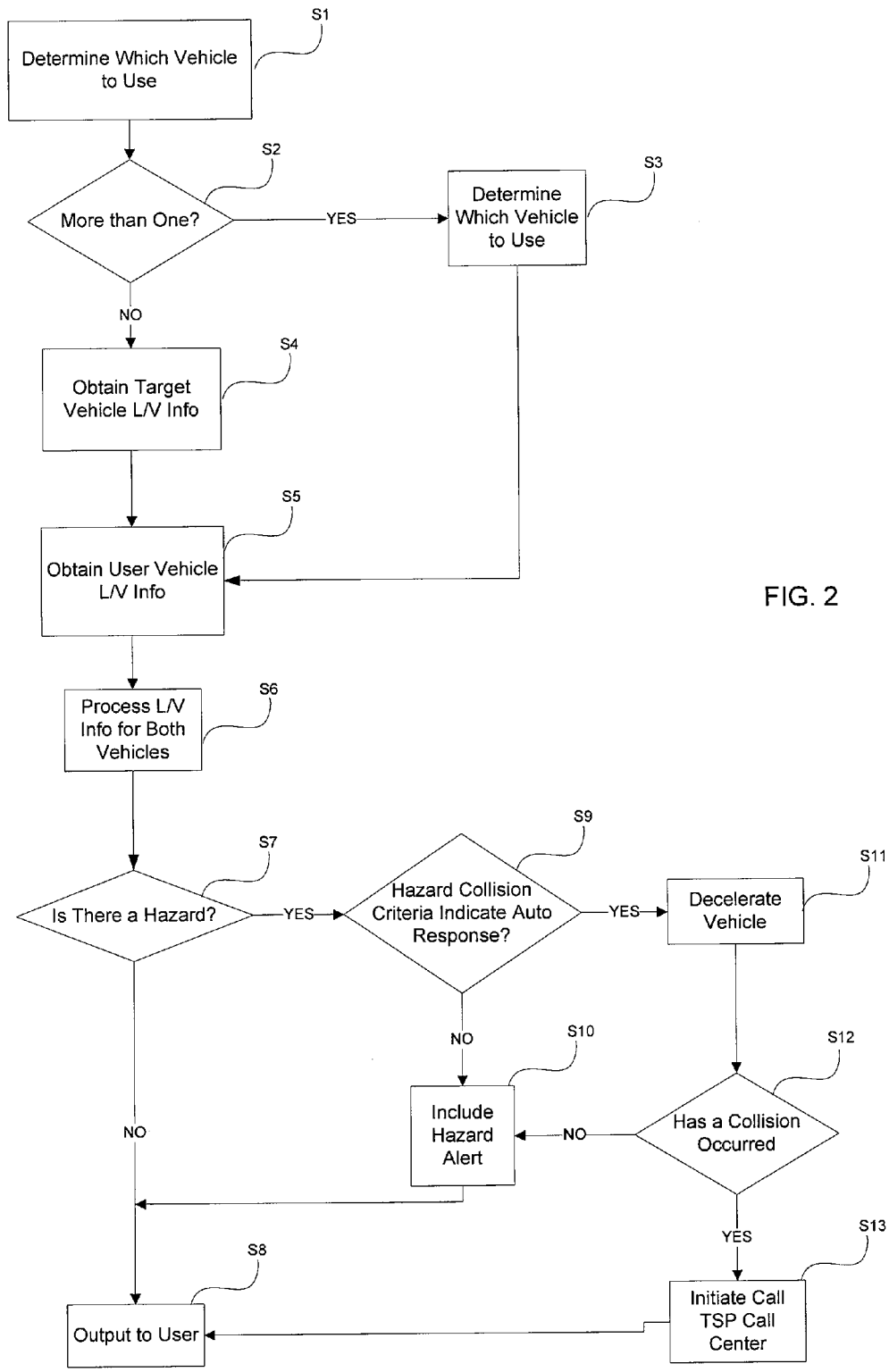
FIG. 2 is a flow chart of the collision avoidance process and response, which may be implemented by a vehicle's on-board telematics.

FIG. 2 illustrates the simplified logic or processing steps, which may be implemented by a telematics unit in order to provide the user of a vehicle with relative location and velocity information of another vehicle. The first step involves receiving location and velocity information of one or more other vehicles in the general vicinity (as detected at S1). Examples discussed more below include additional information transmitted wirelessly from a similar telematics units located on the other vehicle.

In the current example, a wireless message containing location and velocity information is received from another vehicle within a limited area such as within a radius of several hundred to a thousand feet or so around the vehicle. The broadcast area will depend on the particular characteristics of the short range broadcast medium. For example, in some short range broadcast media, the range could be approximately five hundred feet. Those of ordinary skill will recognize that the broadcast media and range discussed above are given by way of example only and it should be recognized that one of ordinary skill may adapt such media to meet the desired broadcast specifications for the collision avoidance application herein.

In some examples, the receiver may receive location and velocity information from more than one vehicle at step S2. Where there is more than one vehicle in the area, determination of what vehicle data to use must be made at step S3. This decision may be based on the distance from the user's vehicle, the speed at which the other vehicle in traveling, or whether the vehicle is getting closer or moving away. In some examples, this determination may be made by the user via the user interface. The user may chose which criteria to use in making the determination e.g., distance, speed, or GPS location of the other vehicle. Once the target vehicle is chosen, the telematics control unit will use the vehicle's location and velocity information and combine it with its own location and velocity information as discussed below. In other examples, the telematics control unit may be programmed to make the determination using any of the criteria above or any other suitable criteria that may be desired.

After the other vehicle has been selected and its location and velocity information is obtained at step S4, the telematics unit determines its own location and velocity at step S5. The user vehicle receives its own location and velocity information from a sensor or sensors located on the vehicle much like those used by current GPS navigation devices. The location and velocity information may be constantly monitored for the operator as such information is needed for on-board system navigation features such as turn-by-turn directions.

Information regarding the location and velocity of both vehicles will be combined and processed by the telematics control unit and the relative location and velocity of the vehicles will be determined a step S6. The telematics control unit processes the information using software or an algorithm that will calculate the relative location and velocity as well as carry out any additional functions based on the information as desired. Among others, these functions may include calculating the probability of collision, determining when such a collision may occur, and the specific location information of the other vehicle. In some examples, where both the user's telematics unit and the other vehicle's unit are parts of on-board navigation systems, calculations may take into account vehicle routing information for the user vehicle as well as for the other vehicle if available. For example, routing information may indicate that the user's vehicle will make a turn and divert from its present course. If it is determined based on relative location and velocity information that the user's vehicle will turn before intersecting with the other vehicle, or vice versa, the probability of collision will be reduced.

Once the relative location and velocity information is determined, this information will be used to determine if a hazard is present at step S7. In some examples, determination of a hazard will be based on probability of collision calculations based on the relative location and velocity information received. This information will be used to determine what response, if any, should be taken by the vehicle.

If no hazard is detected or the hazard is minimal based on the relative location and velocity information, certain data may be output to the user via a user interface based on the information calculated by the telematics control unit at step S8. This information may include an indication that user's driving route is without obstacles, the probability of collision, the amount of time until a collision occurs, and maneuvering suggestions.

Alternatively, when the relative location and velocity calculations indicate there is a hazard, an assessment may be made regarding the level of risk based on certain collision hazard criteria at step S9. If a collision with the user's vehicle is likely, the vehicle may issue a hazard alert or, in some circumstances, automatically respond to avoid the collision. If an automatic response is not warranted, a hazard alert will be provided along with the other information sent to user at step S10. The hazard alert may be audible or visual. If audio is used, the hazard alert may come in the form of a beep, an alarm, a voice warning from the on-board navigation system, or any other suitable audio medium. The hazard alert may also be a visual warning on the user interface. In some examples, there may be different levels or types of hazard alerts based on particular collision hazard criteria. Such criteria may include the probability of collision, the type of collision such as a front collision or rear end collision, or any other suitable criteria. For example, the hazard alert may change as the level of risk changes, as indicated by the collision hazard criteria. If the collision hazard criteria indicates a risk is moderate, the hazard alert may come in the form of a repeating audible beep. The frequency of the beep may increase as the level of risk increased or, alternatively, the beep may become louder. A light that blinks faster or brighter as the level of hazard risk increases also may be used.

If the collision hazard criteria indicate that a collision is imminent, certain components and functions may be triggered in order to attempt to avoid the collision or reduce its severity. For example, the vehicle may take evasive maneuvers automatically in response to the collision hazard criteria without prompting from the user. Such a response may include causing the vehicle to decelerate in order to avoid a collision or other hazard as indicated at step S11.

In some examples, a collision may not be able to be avoided. If it is determined that a collision has occurred at step S12, relative location and velocity information from some interval prior to the collision may also be transmitted to the call center of a telematics service provider at step S13. Such information may be useful if a collision cannot be avoided, but it should be noted that sending the location and velocity information to the call center may be useful in other situations as well. Using the information obtained from the control unit, the call center is able to determine the speed at which the vehicles were traveling prior to the collision as well as the direction they were moving at the time. The call center may relay this information to law enforcement personnel so that they may determine the type of collision and estimate its severity.

Figure 3:
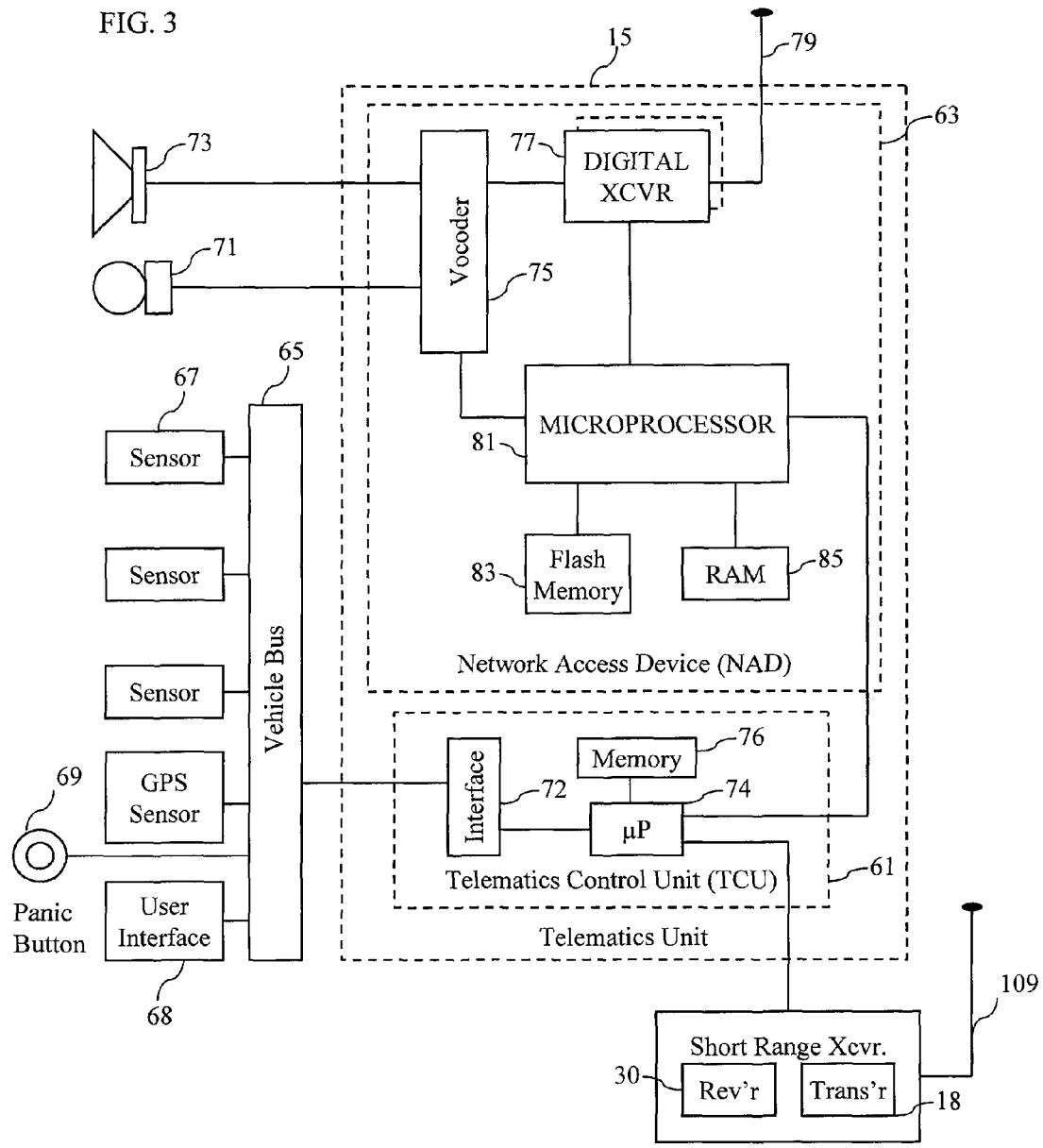
FIG. 3 is a functional block diagram of an exemplary telematics unit, and associated equipment, as may be used in a vehicle application.
Figure 5:
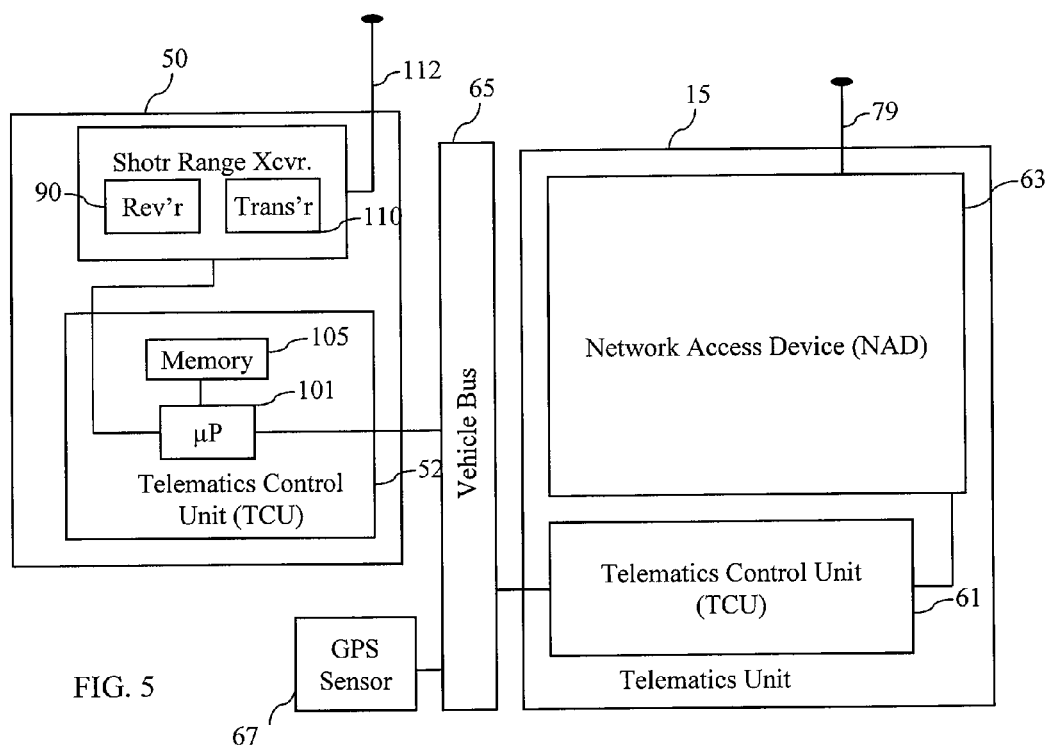
FIG. 5 is a functional block diagram of an exemplary receiving component that may be added to an existing telematics unit, as may be used in a vehicle application.

Different examples are discussed below (with regard to FIG. 3 and FIG. 5) for enabling an on-board vehicle telematics unit to receive location and velocity information directly from another vehicle, which are capable of carrying out the methods described above. FIG. 3 illustrates a telematics unit that includes a receiver for receiving information directly from other vehicles. FIG. 5 illustrates a receiving component that may be added to an existing telematics unit in order to carry out the methods and functions discussed herein. Activities involved in obtaining location and velocity based data are implemented by communication with the telematics unit and/or involve responsive processing in that unit. It is assumed that those skilled in the art are generally familiar with the structure, programming, and operations of mobile stations and telematics units that utilize mobile communication transceivers similar to those of mobile stations. However, to fully understand the relevant communication and processing under discussion here, it may be helpful to some readers to consider a summary discussion of the structure and programming of an example of a telematics unit and related device.

FIG. 3 is a block diagram of an exemplary telematics unit 15 and associated equipment, as may be used in a motor vehicle. The telematics unit 15 includes a telematics control unit (TCU) 61 and a wireless Network Access Device (NAD) 63. The TCU 61 may be implemented as a microprocessor (µP) 74 with one or more memories 76, an interface 72 to vehicle equipment, an interconnection to the NAD 63, and programming to implement the emergency monitoring and notification functions. Microprocessor 74 acts as a controller for controlling all operations of the TCU 61. Microprocessor 74 is a programmable controller. Programming in the memory 76 of the TCU 61, for example, enables the TCU microprocessor 74 to process the data received from other vehicles in the vicinity via receiver 30 and location and velocity information of the user's vehicle from sensors 67. Additionally, TCU 61 works as a processor with memories, interfaces, and programming to implement relative location and velocity monitoring and notification functions. TCU 61 may also process location and velocity information obtained via the interface 72 to detect a collision hazard condition and provide a hazard alert. Information may also be processed to detect occurrence of a collision or other the emergency condition, and, in response, instruct the NAD 63 to initiate an emergency call to the telematics service provider (TSP).

Figure 4:
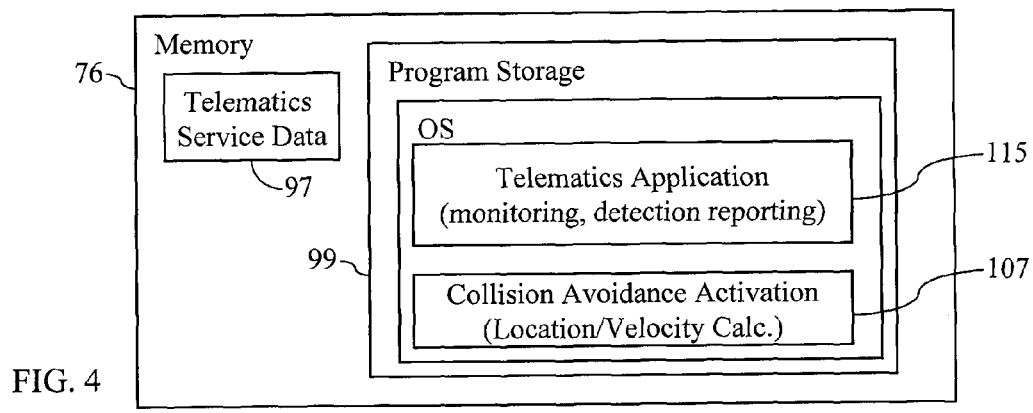
FIG. 4 is a functional block diagram showing a high level representation of the storage that may be provided by the memory in a telematics control unit used in a vehicle application.

It may also be helpful to briefly discuss programming and data storage of the TCU 61. FIG. 4 is a high level representation of the storage that may be provided by the memory 76 and thus of relevant data and programming that may be stored and/or loaded into portions of the memory 76 of the TCU. As shown, a portion 97 stores telematics service data used by the TSP, such as customer identification data, vehicle identification, and/or security keys. Some of this data may be permanently stored in the portion 97 of the TCU memory 76, whereas some of the telematics service data may be downloaded after the unit is installed in the vehicle.

Another portion 99 of the memory 76 stores programming that is to be executed by the microprocessor 74 of the TCU 61. The programming typically includes an operating system (OS) including various device drivers, e.g. for communication with various vehicle systems and sensors via the bus 65, and for communication with the receiver 30 and with the NAD 63. The programming will also include a telematics application 115 running on the OS, to enable the microprocessor 74 to implement regular telematics functions, such as vehicle diagnostics, monitoring of vehicle location and velocity, detection of emergency conditions, communications with other vehicle via the receiver 30, and communications via the NAD 63 and the network to report emergencies, and the like.

The collision avoidance application 107 enables the microprocessor 74 to carry out calculations based on location and velocity information obtained via the receiver 30 and/or through the sensors 67. Data may be processed by carrying out of programming code in the form of software, firmware, or microcode running on one or more of the controllers. The software functionalities involve programming, including executable code as well as associated stored data, for causing the telematics unit to determine relative location and velocity of the user's vehicle and another vehicle, perform additional calculations based on such data, and implement a hazard alert or emergency detection based on such data. For example, the collision avoidance application 107 may trigger the telematics application 115 to implement different alerts, warnings, or avoidance maneuvers based on programmed collision avoidance criteria and calculations based thereon. Such alerts may include audio and/or visual alerts as well as active collision avoidance maneuvers such as causing the vehicle to decelerate in response to a certain perceived level of threat.

Code for implementing the telematics functions may be in the form of computer instruction in any form (e.g. source code, object code, interpreted code, etc.) stored in or carried by any computer or machine readable medium. In operation, the executable code is stored in an area of memory or the like within the respective telematics unit. At other times, however, the programming may be stored at other locations and transported for loading into respective equipment, e.g. into the particular unit from another unit such as when a receiving component is added to an already existing telematics unit as discussed more below.

Hence, implementations of the teachings presented herein may involve one or more software products in the form of one or more modules of executable code and/or data carried by at least one machine readable. Execution of such code by a processor or the like of a telematics control unit enable the unit to implement steps such as outlined above in the discussion of the collision avoidance.

Returning to FIG. 3, the TCU 61 is also programmed to process wireless data received through the receiver 30. Such information includes location and velocity information received from other vehicles in the vicinity, often through the telematics unit of the other vehicle. In some examples, additional information about the other vehicle may be transmitted as well. For example, if the other vehicle has an on-board navigation system with similar features, vehicle routing information may be sent as such information may increase or decrease the likelihood of a collision as discussed more in detail below. Similar information may be transmitted from the user's vehicle to the telematics unit of another vehicles in the area using transmitter 18.

The receiver provides the data received to the microprocessor 74. In the current example, the receiver 30 is directly connected to microprocessor 74 but one of ordinary skill will recognize that it may also be connected through the vehicle bus 65. The receiver 30 is directed toward short range communications. It receives wireless messages broadcast wirelessly directly from other vehicles within the range of a short range broadcast medium unlike the NAD 63 which transmits and receives messages from the TSP call center. Because the receiver 30 does not communicate with the TSP call center, WiFi and/or other short range broadcast media may be used to carry the wireless messages transmitted. The range will depend on the particular characteristics of the short range broadcast medium used. In some examples, the range is approximately five hundred feet.

It should be noted that at least one sensor must be capable of determining location by global position satellite (GPS) processing. In the current example, the GPS sensor is at least one of the sensors 67. The GPS sensor is connected to the TCU 61 through vehicle bus 65 but it should be understood that the GPS sensor may be connected though other components as well. For example, the GPS sensor may be a GPS transceiver located within the NAD 63.

Looking to the current example, the GPS sensor, under control of the microprocessor 74 receives and processes signals from one or more satellites of the GPS constellation of GPS satellites. From its processing, the GPS sensor supplies GPS data to the microprocessor 74, such as pseudorange measurements and associated pseudorandom number (PN) codes for measured satellite signals. Associated computations may be performed in the microprocessor or by a processor or the like included in the GPS sensor to obtain a final fix (latitude and longitude coordinates) as the location of the vehicle. The microprocessor processes the location data over time to determine velocity (direction and speed of travel).

In some examples, it may be beneficial to transmit the location and velocity information obtained via microprocessor 74 to similar vehicles in the area. In order to transmit the data, a transmitter 18 is used. The transmitter 18 may be connected to TCU 61 and may broadcast location and velocity information obtained via the sensors 67 using antenna 109. As illustrated in FIG. 2, antenna 109 is used to transmit information from transmitter 18 and receive information from receiver 30 but it will be apparent to one of ordinary skill that antenna 109 may be omitted and the transmitter and receiver may be connected directly to antenna 79 in the NAD 63. The wireless messages transmitted by transmitter 18 using a short range broadcast medium similar to that used for receiver 30 such as WiFi. In some examples, receiver and transmitter may be replaced by, or part of, a transceiver for carrying out both transmitting and receiving.

A vehicle typically includes a vehicle bus, shown at 65 in FIG. 3, for providing digital data communications among various on-board devices/systems, particularly for vehicle diagnostics purposes. In addition to GPS monitoring, the vehicle also includes one or more sensors 67 for detecting conditions that may indicate an obstacle or emergency. The vehicle bus 65 provides the continuous electrical connection within the vehicle for the communication of diagnostics data from the sensors 67 to the TCU 61. The TCU 61 is programmed to process data received from the sensors to monitor the GPS location and velocity of the vehicle as well as to detect any possible emergency including a vehicle crash and to generate data regarding the detected crash, e.g. to indicate severity. The vehicle may also include a panic button 69 which may also be used as an emergency detector. The panic button is coupled to and communicates with the TCU 61 via the vehicle bus 65. A vehicle occupant may activate the panic button 69 in the event of an emergency. If a crash occurs, an emergency detector will be triggered. In some examples, the emergency detector may be a crash responsive sensor among sensors 67.

The TCU 61 may determine that there has been an emergency event that warrants a report to the TSP call center. This may occur in response to crash detection information from the processing of the data from the sensors 67 or in response to activation of the panic button 69 by the vehicle user. In response to any determination of a collision or an emergency condition, the TCU 61 activates the NAD 63 to initiate the communication with the TSP call center.

The NAD 63 acts as the communications tool for entry to the wide area wireless network via cellular communications. NAD 63 will send a signal to the TSP call center alerting the call center of the possible emergency. The NAD 63 is a wireless transceiver unit configured for communications via the wireless communication facilities of the mobile network and associated landline facilities.

The NAD 63 is generally similar to a wireless mobile station configured for voice and data communications. It is assumed that those skilled in the art are familiar with the structure and operation of mobile stations and thus with the structure and operation of generally similar devices that may be used to implement the NAD 63. To ensure a full understanding by all readers, however, it may be helpful to consider a high level summary review of the relevant structure of one example of a NAD 63.

The NAD 63 supports both data communication and voice communication. For the voice communication function, the vehicle will include a microphone 71 for audio signal input and a speaker 73 for audio signal output. The microphone 71 and the speaker 73 connect to voice coding and decoding circuitry (vocoder) 75 within the NAD 63. During a voice telephone type communication with the TSP call center, for example, the vocoder 75 provides two-way conversion between analog audio signals representing speech or other audio and digital samples at a compressed bit rate compatible with the digital protocol of the wireless network communications.

For digital wireless communications, the NAD 63 also includes a digital transceiver (XCVR) 77. The transceiver 77 may be used to transfer any information obtained regarding the location and velocity of the vehicle, any information regarding relative location and velocity of the user's vehicle and another vehicle, and any additional crash related information obtained by sensors 67 to the call center. The concepts discussed here encompass embodiments of the NAD 63 utilizing any digital transceivers that conform to current or future developed digital wireless communication standards. For example, the digital transceiver 77 may be a CDMA transceiver compatible with operation via an IS-95 network or a 1x-RTT network, to provide both voice and/or data communications.

The transceiver 77 provides two-way wireless communication of information, such as vocoded speech samples and digital message information. The transceiver 77 also sends and receives a variety of signaling messages in support of the various communications provided via the NAD 63 and the various wireless network facilities. The transceiver 77 connects through RF send and receive amplifiers (not separately shown) to an antenna 79. It should be noted that antenna 79 might also be used by receiver 30 to obtain GPS information. Although antenna 79 is located in the NAD 63 in the current example, it may also be coupled to the TCU 61. In the current example, receiver 30 is also connected to the antenna 109 but in other examples antenna 109 may be omitted and receiver 30 may be connected to antenna 79 as well.

The NAD 63 may include one or more additional transceivers, as shown in dotted line form, for operation in an analog mode or in accord with an alternative digital standard, such as EVDO. In the event of a crash, information obtained from the sensors 67 (e.g. location and type of emergency event), information obtained via receiver 30 (e.g. location and velocity of the other vehicle), and any calculations based thereon will be transferred to the NAD 63 to be communicated to the call center of the TSP. This information, stored in TCU 61, may be transferred from microprocessor 74 of TCU 61 to microprocessor 81 of NAD 63.

A microprocessor 81 acts as a control unit for controlling all operations of the NAD 63. The microprocessor 81 is a programmable control unit. The NAD 63 also includes flash type program memory 83 and/or a non-volatile random access memory (RAM) 85, for storing various software routines and mobile configuration settings, for use by the microprocessor 81. The actual emergency dialing program implemented by the telematics unit may be stored in the flash memory 83 of the NAD 63. Alternatively, this programming may be stored in program memory of the TCU 61.

Those skilled in the art will recognize that the distribution of programming as between the TCU 61 and the NAD 63 is only given here by way of example. Programming functions may be shifted between these two elements of the telematics unit 15. For example, the actual emergency dialing program implemented by the telematics unit may be stored in the flash memory 83 of the NAD 63 or this programming may be stored in program section 107 of the memory 76 of the TCU 61. Another approach might integrate the TCU and NAD into a single unit and thus combine programming for those elements.

If more that one vehicle in the broadcast range is transmitting its location and velocity information, the receiver 30 will receive the broadcasts from all vehicles. A decision must be made regarding which vehicle to use when the TCU 61 calculates information based on relative location and velocity. This decision may be made in a variety of ways. For example, the decision may be made by TCU 61 based on predetermined criteria. This criteria may include the speed at which the other vehicle is traveling, the other vehicle's distance from the user's vehicle, or whether the other vehicle is moving toward or away from the user's vehicle. The TCU 61 may be programmed to decide which vehicle information to use or, in some examples, the user may decide using the user interface 68.

The user interface 68 usually includes one or more elements such as a keypad and display for non-emergency input/output functions. In some examples, the keypad and display may be replaced by a touch display. The user interface 68 may also include an audio output component that provides audio output within the vehicle. This audio output may be supplied through the vehicle speaker system or other audio outputs in the vehicle. The vehicle bus 65 provides digital data communications between the user interface 68 and the TCU 61.

Of note for purposes of this discussion, input by a user via the keys or touch display of the user interface 68 will trigger the TCU 61 to chose a particular vehicle from a plurality of vehicles in the broadcast range. If information is available for more than one vehicle, each vehicle may show up on the display. In some examples, the vehicles may show up as icons and, in others, they may be organized into a list sorted by certain criteria (e.g. distance from the user's vehicle). The user may key in information to identify which vehicle should be used by TCU 61 to determine relative location and velocity information.

Based on information resulting from the relative location and velocity calculations performed by microprocessor collision hazards may be detected and warnings or alerts sent to the user via the user interface 68. The hazard alert may show up as a visual alert on the display of the user interface 68. It also may be an audio alert via the vehicle speaker system or any other suitable audio medium. As explained above, different collision hazard criteria based on the relative location and velocity of the vehicles may trigger different responses or alerts. As the level of risk as indicated by the collision hazard criteria increases, a visual warning such as a light may become brighter or blink faster while an audio warning may become louder or increase its frequency. In some examples where the collision hazard criteria indicates that a collision is imminent, the TCU 61 may cause the vehicle to decelerate without input from the user. This may allow the vehicle to avoid the collision or reduce its severity.

The structure and operation of the telematics unit 15 with the TCU 61 and the NAD 63, as outlined above, were described to by way of example, only. Those skilled in the art will recognize that the telematics unit 15 may be implemented and may operate in a variety of other ways.

The above examples assume the receiver 30 is a component within telematics unit 15. However, if the telematics unit is not initially configured to obtain information from other similarly equipped vehicles or to perform the desired function based on that information, a separate receiving unit may be added to or incorporated in the existing telematics unit of an already existing on-board system in order to carry out these functions. An exemplary receiving unit is shown in FIG. 5. In this example, receiving unit 50 includes various components including a receiver 90, a transmitter 110, and a controller 52 made up of a microprocessor 101 and a memory 105. Receiving unit 50 communicates with the existing telematics unit 15 via the vehicle bus 65. In other examples, microprocessor 101 may be directly connected to microprocessor 74.

An antenna 112 may be included in receiving unit 50 for use by the controller 52 and receiver 90 for receiving broadcast signals. The receiver 90 may function in essentially the same way as receiver 30 described above. The receiver 90 may receive location and velocity information transmitted from another vehicle using a short range broadcast medium. Controller 52 may be made up of microprocessor 101 and at least one memory unit 105. Microprocessor 101 is configured to communicate with TCU 61 and can be used to signal TCU 61 to send information regarding the user's vehicle location and velocity data stored in TCU 61. Additionally, microprocessor 101 can be configured to determine the relative location and velocity information for the two vehicles as well as to carry out any other calculations based thereon. The programming necessary to carry out the location and velocity calculations as well as any other programming necessary to allow receiving unit 50 to communicate with telematics unit 15 may be stored in memory unit 105. After the desired information and calculations are obtained, microprocessor 101 may send this information to TCU 61 so that TCU 61 may output the information to the user via the user interface 68.

As above, in the situation where location and velocity transmissions are received by the receiver from more that one vehicle in the vicinity, a determination must be made with regard to which vehicle information to use. In some examples, the microprocessor 101 is configured to make that determination based on certain collision hazard criteria such as the distance from the user's car, the speed at which the other vehicles are traveling, and/or the direction in which the cars are traveling. In other examples, the location and velocity information for the vehicles is transferred to TCU 61 so that the user may determine which vehicle to use via the user interface. Once the user identifies which vehicle to track, that information is sent back to controller 52 so that microprocessor 101 can determine relative location and velocity of the two vehicles along with any other calculations based on that information such as the probability of collision, time until collision, and any other desired calculation based on the information. If the calculations indicate that a risk of a hazard exists, this information will be transferred to TCU 61 so that a hazard alert may be sent to the user via the user interface.

All relative velocity determinations and calculations thereon are performed by microprocessor 101 in the above example. However, one of ordinary skill will recognize that such calculations may also occur on microprocessor 74. In some examples, the information required to carry out the desired calculations could be downloaded from memory unit 105 and transferred to microprocessor 74 by any appropriate means and programming known to one of ordinary skill during the installation of the receiving unit 50. In such an example, the receiver 90 may receive location and velocity information which may be sent by controller 52 to TCU 61 for further use. For convenience of illustration, separate microprocessors 74, 101 exist, but it should be noted that one microprocessor may be programmed to carry out all functions. In such an example, memory unit 105 may contain the necessary programming to send to the microprocessor on the preexisting telematics unit so that it may be programmed to carry out the functions as desired.

In addition to receiving information, an additional transmitter 110 may also be included in the receiving unit 50. Transmitter 110 functions in essentially the same way as transmitter 18 discussed above. Location and velocity information is obtained from sensors 67 and sent to TCU 61 which then sends the information to receiving unit 50 to be broadcast by transmitter 110 using a short range broadcast medium. In an alternative example, receiving unit 50 could be configured to obtain information from sensors 67 directly through vehicle bus 65. In some examples, the receiver 90 and transmitter 110 of the receiving unit 50 may be replaced by a transceiver for carrying out both transmitting and receiving.

The structure and operation of the telematics unit 15 with the TCU 61 and the NAD 63, as well as receiving unit 50 as outlined above, were described to by way of example only. Those skilled in the art will recognize that the telematics unit 15 and receiving unit 50 may be implemented and may operate in a variety of other ways.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A system for a vehicle, comprising:
a user interface for providing information to and receiving information from a user of the vehicle, the user interface including either a touch display or a keypad and a display;
a system of one or more sensors for sensing location and velocity of the user's vehicle;
a short range transmitter for direct wireless broadcast of data regarding the sensed location and velocity of the user's vehicle without engaging the public wireless mobile communications network;
a short range receiver for direct wireless reception of wirelessly broadcast data regarding location and velocity of any other vehicle within the short range of the user's vehicle without engaging the public wireless mobile communications network;
a telematics unit, comprising:
an emergency detector for detecting an emergency condition, and
a network access device including a wireless transceiver for wireless cellular communication via the public wireless mobile communication network for voice and/or telemetry communication with a call center of a telematics service provider; and
a control unit, responsive to a detected emergency condition to control the network access device of the telematics unit to report the detected emergency condition through the public wireless mobile network to the call center and responsive to the system of one or more sensors and the short range receiver, for controlling information output for the user via the user interface,
wherein the control unit also is configured to:
receive, from the user via the keypad or the touch display of the user interface, a selection of a collision hazard criteria from among a plurality of collision hazard criteria, when data is directly received from a plurality of other vehicles within the short range of the user's vehicle without engaging the public wireless mobile communications network, select another vehicle from among the plurality of other vehicles based on the user-selected collision hazard criteria, process the location and velocity of the user's vehicle and the received data regarding location and velocity of the selected other vehicle to detect a collision hazard relative to the selected other vehicle and detect one of a plurality of levels of risk of collision relative to the selected other vehicle, and responsive to the detections, cause the user interface to output a hazard alert indicating the detected level of risk of collision relative to the selected other vehicle.

2. The system of claim 1, wherein the network access device communicates information based on relative location and velocity of the user's vehicle and the selected other vehicle to the public wireless mobile communication network and provides additional information to the user based on the information from the control unit.

3. The system of claim 1, wherein the short range receiver is configured to receive data regarding location and velocity from a telematics unit and/or routing information from an on-board navigation system of each of the plurality of other vehicles.

4. The system of claim 1, wherein the hazard alert is a visual and/or audio warning to the user.

5. The system of claim 1, wherein the control unit is further configured to cause to vehicle to decelerate in response to the detected level of risk of collision.

6. The system of claim 1, wherein the control unit is further configured to receive data regarding location and velocity information of each of the plurality of other vehicles.

7. The system of claim 1, wherein the collision hazard criteria are used to select one or more metrics for determining whether the hazard is present.

8. The system of claim 7, wherein the metrics used for determining whether the hazard is present include at least one of distances between the user's vehicle and vehicles of the plurality of other vehicles, speed of vehicles of the plurality of other vehicles, and global positioning satellite (GPS) location of other vehicles of the plurality of other vehicles.

* * * * *